United States Patent
Shikuma et al.

(10) Patent No.: US 7,897,092 B2
(45) Date of Patent: Mar. 1, 2011

(54) METHOD FOR PRODUCING NON-FOAMED MOLDED BODY

(75) Inventors: Haruo Shikuma, Shiga (JP); Masayuki Yamamoto, Shiga (JP); Naoto Kubo, Shiga (JP)

(73) Assignee: Shinsei Kagaku Co., Ltd., Otsu-shi (JP)

( * ) Notice: Subject to any disclaimer, the term of this patent is extended or adjusted under 35 U.S.C. 154(b) by 520 days.

(21) Appl. No.: 11/916,031

(22) PCT Filed: May 23, 2006

(86) PCT No.: PCT/JP2006/310238
§ 371 (c)(1),
(2), (4) Date: Feb. 19, 2008

(87) PCT Pub. No.: WO2006/129522
PCT Pub. Date: Dec. 7, 2006

(65) Prior Publication Data
US 2010/0155997 A1 Jun. 24, 2010

(30) Foreign Application Priority Data

| May 30, 2005 | (JP) | 2005-157904 |
| Mar. 24, 2006 | (JP) | 2006-083435 |
| Apr. 3, 2006 | (JP) | 2006-101804 |

(51) Int. Cl.
*B29C 45/18* (2006.01)
(52) U.S. Cl. .................................. 264/328.17
(58) Field of Classification Search .............. 264/328.17
See application file for complete search history.

(56) References Cited

U.S. PATENT DOCUMENTS

| 6,146,577 | A * | 11/2000 | Yamaki et al. ................. 264/500 |
| 6,337,039 | B1 * | 1/2002 | Yamaki et al. ............... 264/1.33 |
| 6,361,724 | B1 * | 3/2002 | Maeda et al. ................... 264/85 |
| 6,929,763 | B2 * | 8/2005 | Yamaki ......................... 264/40.3 |

FOREIGN PATENT DOCUMENTS

| JP | 05 318541 | 12/1993 |
| JP | 2004 133148 | 4/2004 |
| JP | 2004-160917 | 6/2004 |

* cited by examiner

*Primary Examiner* — Jill L Heitbrink
(74) *Attorney, Agent, or Firm* — Oblon, Spivak, McClelland, Maier & Neustadt, L.L.P.

(57) ABSTRACT

Provided are a process for efficiently producing a non-foamed molded body by impregnating an amorphous thermoplastic resin with 0.3 to 3.0% by mass of carbon dioxide and/or 0.05 to 1.0% by mass of nitrogen and then supplying the amorphous thermoplastic resin thus obtained which is impregnated with carbon dioxide and/or nitrogen to an uppermost stream part of a cylinder in an injection molding machine and molding it and a non-foamed molded body produced thereby.

12 Claims, No Drawings ated thereby is known as a method for enhancing
METHOD FOR PRODUCING NON-FOAMED MOLDED BODY This application is a 371 of PCT/JP2006/310238 filed May 23, 2006.

BACKGROUND OF THE INVENTION

The present invention relates to a production process for a non-foamed molded body and a non-foamed molded body produced thereby, specifically to a process for efficiently producing a non-foamed molded body by injection-molding an amorphous thermoplastic resin impregnated with a small amount of carbon dioxide and/or nitrogen and a non-foamed molded body produced thereby.

RELATED ART

In injection molding of optical plastic parts and the like, required are, in addition to a molding processability (fluidity), improvement in a transferability on a metal die surface, inhibition of orientational distortion, inhibition of warpage, prevention of coloring caused by thermal degradation (improvement in a transparency) and the like.

In general, a melt viscosity is one of indices showing a fluidity of a thermoplastic resin. Thermoplastic resins have a high melt viscosity and are inferior in a fluidity as a molding material, and therefore in the case of thin-walled parts, the resin can not completely be filled or the transferability is unsatisfactory in many cases.

A method for reducing a viscosity of a molten resin to elevate a fluidity thereof includes a method in which a molding temperature is raised. However, if a molding temperature is raised, thermal decomposition of the resin itself depending on the resin composition and thermal decomposition of the additives and the like are brought about, and caused are the problems of not only a strength of the molded body but also foreign matters produced by the degraded resin, stain of the metal die, coloring (discoloration) and the like. Further, the problem that a cooling speed of the resin in the metal die is slowed down to elongate the molding cycle time is involved therein.

Another method for elevating the fluidity includes a method in which a molecular weight of a resin is reduced and a method in which a plasticizer is added to a resin material, but the problem that a mechanical strength and like of the resin are reduced is brought about.

Then, a method in which a resin is impregnated with carbon dioxide and nitrogen to plasticize the resin and in which a melt viscosity and a glass transition temperature (Tg) of the resin are reduced thereby is known as a method for enhancing a fluidity of a molten resin without elevating a molding temperature and reducing a molecular weight of the resin (refer to a non-patent document 1 and patent documents 1 to 3).

Disclosed in the patent document 1 is an injection molding method in which a compound turned into gas at 40° C. is introduced directly into a cylinder of an injection molding machine to impregnate a thermoplastic resin with the gas and in the state that a metal die cavity is opened to the atmosphere or reduced in a pressure, the thermoplastic resin is injected into the metal die cavity and in which the resin is pushed by a pressing force higher than a pressure producing air bubbles in the resin. Involved in the above method, however, is the problem that not only specific facilities such as a pressure-tight cylinder, a carbon dioxide supplying equipment and the like are required but also stable injection molding is difficult.

Disclosed in the patent document 2 is an injection molding method in which a molten resin reduced in a melt viscosity by dissolving therein 0.2 to 10% by weight of carbon dioxide is filled into a metal die cavity while foaming it at a flow front (a tip part in the flow of the molten resin in a metal die) and in which the resin is then pressurized to a higher level than a pressure inhibiting the resin from foaming. Involved in the above method, however, is the problem that foaming patterns remain on the surface of the resulting molded body.

Further, disclosed in the patent document 3 is an injection molding method characterized by adding carbon dioxide to an alloy resin obtained by mixing a crystalline thermoplastic resin such as syndiotactic polystyrene and the like with a non-crystalline thermoplastic resin such as a styrene base resin and the like to plasticize the alloy resin and molding it at temperature lower than a melting point of the crystalline thermoplastic resin itself. However, the above method can not be applied to a resin composition comprising only a non-crystalline resin.

A technique "AMOTEC" (registered trade name) in which carbon dioxide is dissolved in a molten resin in an injection molding machine and in which a metal die is filled in advance with carbon dioxide before injecting the resin is known as a technique to which the above method is applied. In the above technique, however, specific gas supplying equipment, injection molding machine and metal die are required.

In light of the above situations, a process for producing a non-foamed molded body by simpler and more efficient injection-molding using carbon dioxide, nitrogen and the like is desired to be developed.

Non-patent document 1: Hisao Hachisuka, Polymer Journal, vol. 22, No. 1, pp. 77 to 79 (1990)
Patent document 1: Japanese Patent Application Laid-Open No.
Patent document 2: International Publication No. 01/96084 pamphlet
Patent document 3: Japanese Patent Application Laid-Open No. 211483/2003

DISCLOSURE OF THE INVENTION

In light of the existing situation described above, an object of the present invention is to provide a process for efficiently producing a non-foamed molded body by injection-molding an amorphous thermoplastic resin impregnated with a small amount of carbon dioxide and/or nitrogen making use of a conventional injection molding machine and a non-foamed molded body produced thereby.

Intensive investigations repeated by the present inventors in order to achieve the object described above have resulted in finding that the problem can be solved by carrying out injection molding by impregnating a resin in advance with carbon dioxide and/or nitrogen of an amount which can inhibit the resin from foaming in a metal die.

That is, the present invention provides the following inventions (1) and (2).

(1) A production process for a non-foamed molded body comprising:
impregnating an amorphous thermoplastic resin with 0.3 to 3.0% by mass of carbon dioxide and/or 0.05 to 1.0% by mass of nitrogen and then
supplying the amorphous thermoplastic resin thus obtained which is impregnated with carbon dioxide and/or nitrogen to an uppermost stream part of a cylinder in an injection molding machine and molding it.

(2) A non-foamed molded body obtained by the process as described in the above item (1).

According to the process of the present invention, since a fluidity of the resin is enhanced, the torque load in molding processing can be reduced (reduced in energy), and the resin flow length in a metal die can be increased by about 5 to 25%. Further, a decomposition reaction rate of the resin can be slowed, and the molding temperature can be reduced by about 10° C. from a usual temperature area. Accordingly, the molded body can be inhibited from being colored by heating, and the non-foamed molded body having an excellent appearance can efficiently be produced. Further, a transferability of a metal die surface can be enhanced, and the molded body, even if it is thin-walled, can be reduced in orientational distortion and warpage.

According to the process of the present invention, an injection-molded body can be produced by means of a conventional injection molding machine equipped with a shut off nozzle, and specific facilities are not required to be used.

BEST MODE FOR CARRYING OUT THE INVENTION

The production process of the present invention for a non-foamed molded body is largely characterized by (i) impregnating an amorphous thermoplastic resin with 0.3 to 3.0% by mass of carbon dioxide and/or 0.05 to 1.0% by mass of nitrogen and (ii) supplying the above amorphous thermoplastic resin impregnated with nitrogen to an uppermost stream part of a cylinder in an injection molding machine and injection-molding it.

The amorphous thermoplastic resin constituting the non-foamed molded body in the present invention shall not specifically be restricted as long as it is a resin which is usually used as various molding materials for films, sheets, substrates and the like and which can be impregnated with carbon dioxide and/or nitrogen. The above amorphous thermoplastic resin includes polystyrene base resins, polycarbonate base resins, polymethacrylate base resins, cycloolefin base resins, polyvinyl chloride base resins and the like.

The polystyrene base resins include general purpose polystyrene (GPPS), rubber-reinforced polystyrene (HIPS), acrylonitrile-styrene copolymers (AS), acrylonitrile-butadiene-styrene copolymers (ABS), styrene-isoprene-styrene copolymers (SIS), styrene-ethylene/butylene-styrene block copolymers (SEBS), styrene-methyl methacrylate copolymers, styrene-methyl methacrylate-butadiene copolymers, styrene-butadiene rubbers (SBR) and the like. The polystyrene base resins have preferably a mass average molecular weight (Mw) of 50,000 to 400,000.

The polycarbonate base resins are preferably polycarbonates having hydrocarbon derivatives having a substituent of bis(4-hydroxyphenyl), bis(3,5-dialkyl-4-hydroxyphenyl) or bis(3,5-dihalo-4-hydroxyphenyl), and bisphenol A type polycarbonate having 2,2-bis(4-hydroxyphenyl)propane (bisphenol A) is particularly preferred. The polycarbonate base resins have preferably a mass average molecular weight (Mw) of 10,000 to 50,000.

The polymethacrylate base resins include polymethyl acrylate, polymethyl methacrylate (PMMA), methyl methacrylate-styrene copolymers and the like. The polymethacrylate base resins have preferably a mass average molecular weight (Mw) of 50,000 to 600,000.

The cyclo(cyclic)olefin base resins are preferably cycloolefin polymers manufactured by Zeon Corporation, trade names "ZEONOR" and "ZEONEX", ethylene.tetracyclododecene copolymers manufactured by Mitsui Chemicals, Inc., trade name "APEL", cycloolefin polymers manufactured by Topas Advanced Polymers GmbH, trade name "TOPAS" and the like.

The polyvinyl chloride base resins include polyvinyl chloride (PVC), vinyl chloride-ethylene copolymers, vinyl chloride-vinyl acetate copolymers and the like. The polyvinyl chloride base resins have preferably a mass average molecular weight (Mw) of 40,000 to 200,000.

The other amorphous thermoplastic resins include polysulfone, polyethersulfone (PES), polyphenylene oxide (PPO), polyarylate (PAR), polyimide (PI), polyetherimide (PEI), polyamideimide, polytetrafluoroethylene, polyethylene tetrafluoride, polyvinyl acetate, polyvinylidene chloride, liquid crystal thermoplastic resins, biodegradable resins and the like.

The biodegradable resins include aliphatic polyesters, polyvinyl alcohol (PVA), cellulose derivatives and the like. The aliphatic polyesters include polylactic acid (PLA) resins and derivatives thereof, polyhydroxybutylate (PHB) and derivatives thereof, polycaprolactone (PCL), polyethylene adipate (PEA), polytetramethylene adipate, polyglycolic acid (PGA), condensation products of diols and dicarboxylic acids and the like. The celluloses include acetyl cellulose, methyl cellulose, ethyl cellulose and the like.

Among them, the polylactic acid resins are preferred. The polylactic acid resin is a polycondensation product of lactic acid or lactide. The polylactic acid resin includes optical isomers of a D body, an L body and a DL body, and it comprises a single substance thereof or a mixture thereof. The polylactic acid resins have preferably a mass average molecular weight (Mw) of 100,000 to 400,000.

Among the amorphous thermoplastic resins described above, the polystyrene base resins, the polycarbonate base resins, the polymethacrylate base resins and the cycloolefin base resins are particularly preferred.

The amorphous thermoplastic resins described above can be used alone or in a mixture of two or more kinds thereof.

Also, inorganic or organic fillers can be blended for the purposes of providing the strength and the heat resistance and enhancing the dimensional accuracy. Further, flame retardants, antioxidants, UV absorbers, antistatic agents, plasticizers, lubricants, colorants and the like can be blended as additives.

It is important that the amorphous thermoplastic resin is impregnated in advance with 0.3 to 3.0% by mass, preferably 0.5 to 3.0% by mass and more preferably 0.5 to 1.9% by mass of carbon dioxide and/or 0.05 to 1.0% by mass, preferably 0.08 to 0.9% by mass and more preferably 0.1 to 0.8% by mass of nitrogen before supplied to an injection molding machine.

An impregnation method for carbon dioxide and/or nitrogen shall not specifically be restricted. For example, particles of the amorphous thermoplastic resin are put in a pressure vessel, and carbon dioxide and/or nitrogen are supplied into the above pressure vessel. The vessel is held under heating or applying pressure for prescribed time, whereby the resin particles can be impregnated with carbon dioxide and/or nitrogen.

A pressure for impregnation of carbon dioxide is preferably 1 to 40 MPa, more preferably 2 to 20 MPa and further preferably 2 to 15 MPa, and a pressure for impregnation of nitrogen is preferably 1 to 30 MPa, more preferably 2 to 20 MPa and further preferably 3 to 10 MPa.

A temperature for impregnation of carbon dioxide and/or nitrogen is preferably not higher than a glass transition temperature (Tg) of the amorphous thermoplastic resin, and it is, though varied depending on the resins, more preferably 230 to −30° C., further preferably 100° C. to room temperature or lower. Time for impregnation is, though varied depending on the pressure, the temperature, the kind of the resin and the like, usually 1 minute to 100 hours, preferably 0.5 to 30 hours and more preferably 1 to 30 hours.

A batch method, a method in which the resin particles are introduced into a processing zone of nitrogen and continuously processed and the like can be employed as an impregnation processing method. In this respect, the resin particles represent particles such as powders, grains, pellets and tablets of the resins described above, and they shall not specifically be restricted as long as they have a form in which they can be supplied as a raw material for injection molding.

In impregnation of carbon dioxide, an organic solvent can be added as an auxiliary agent in a proportion of about 0.05 to 1% by mass based on the plasticizer.

The organic solvent which can be used shall not specifically be restricted and includes alcohol base solvents, ketone base solvents and ether base solvents, and in addition thereto, it includes benzene, toluene, polyols and the like.

The alcohol base solvents include methanol, ethanol, n-propanol, isopropanol, n-butanol, tertiary butanol, isobutanol, diacetone alcohol and the like. The ketone base solvents include acetone, methyl ethyl ketone, diethyl ketone, methyl isobutyl ketone and the like. The ether base solvents include dibutyl ether, tetrahydrofuran, dioxane, cyclic ethers and the like. Among them, particularly preferred are the alcohol base solvents such as ethanol, propanol and the like and the ketone base solvents such as methyl ethyl ketone and the like.

Carbon dioxide and/or nitrogen supplied to the pressure vessel may stay in a state of a conventional steel cylinder pressure at the time of supplying or may stay in a subcritical state or a supercritical state. Further, it may fall in a subcritical state or a supercritical state after supplied into the pressure vessel.

Conditions for impregnating the resin particles with carbon dioxide and/or nitrogen can suitably be determined according to the characteristics of the resin itself, the shape of the targeted molded body, the uses thereof and the like. For example, carbon dioxide at room temperature and a steel cylinder pressure (about 5 MPa) and/or nitrogen at room temperature and a steel cylinder pressure (about 10 MPa) are supplied to the pressure vessel, and the resin particles are held for 0.5 to 24 hours while suitably stirring if necessary, whereby the resin particles are impregnated with 3 to 10% by mass of carbon dioxide and/or 0.05 to 1.0% by mass of nitrogen. It is preferred from the viewpoint of the facilities to mix the above resin particles with resin particles which are not impregnated with carbon dioxide and/or nitrogen to control an impregnation amount of carbon dioxide and/or nitrogen.

However, the impregnation property of carbon dioxide and/or nitrogen is varied depending on the resins, and resin materials requiring a long time for impregnation of carbon dioxide and/or nitrogen at a steel cylinder pressure under room temperature are present as well. Accordingly, in order to shorten an impregnation time of carbon dioxide and/or nitrogen, impregnation is preferably carried out at the glass transition temperature or lower under a subcritical state or a supercritical state.

In this connection, the "subcritical state" of carbon dioxide or nitrogen shows (i) a liquid state in which pressure is not lower than a critical pressure (7.38 MPa) of carbon dioxide or not lower than a critical pressure (3.4 MPa) of nitrogen and in which temperature is lower than a critical temperature (31.1° C.) of carbon dioxide or lower than a critical temperature (−147° C.) of nitrogen, (ii) a liquid state in which pressure is lower than a critical pressure of carbon dioxide or nitrogen and in which temperature is not lower than a critical temperature of carbon dioxide or nitrogen or (iii) a state in which both temperature and pressure are lower than critical points of carbon dioxide or nitrogen but close thereto.

To be more specific, a state in which temperature is 20 to 31° C. and in which pressure is 5 MPa or more is preferred in the case of carbon dioxide, and a state in which temperature is room temperature to 100° C. and in which pressure is 1 to 3.4 MPa is preferred in the case of nitrogen.

The "supercritical state" shows a state in which pressure is not lower than a critical pressure of carbon dioxide and/or nitrogen and in which temperature is not lower than a critical temperature thereof. In order to allow carbon dioxide to fall in a supercritical state, the temperature is set preferably to 40 to 50° C., and the pressure is set preferably to 7.38 to 30 MPa, particularly preferably 8 to 20 MPa. In order to allow nitrogen to fall in a supercritical state, the temperature is set preferably to room temperature to 100° C., and the pressure is set preferably to 3.4 to 30 MPa, particularly preferably 5 to 20 MPa.

When using carbon dioxide staying in a subcritical state or a supercritical state, it is held usually for 1 minute to 30 hours, preferably 5 minutes to 5 hours, and when using nitrogen staying in a subcritical state or a supercritical state, it is held usually for 10 minutes to 30 hours, preferably 1 to 10 hours.

An impregnation amount of carbon dioxide is set to 0.3 to 3.0% by mass, preferably 0.5 to 1.9% by mass based on the resin particles in the manner described above or an impregnation amount of nitrogen is set to 0.05 to 1.0% by mass, preferably 0.08 to 0.9% by mass and more preferably 0.1 to 0.8% by mass based on the resin particles.

Then, pressure in the pressure vessel is released, and the resin particles in the inside are taken out. This pressure release allows a part of carbon dioxide and/or nitrogen impregnated into the resin particles and the organic solvent added if necessary to be diffused from the resin particles in the form of gas, and about 50% by mass of carbon dioxide impregnated or about 60% by mass of nitrogen impregnated remains in the resin particles if it is within 5 hours at room temperature after the pressure is released. When impregnated with carbon dioxide and/or nitrogen staying in a subcritical state, or a supercritical state, the pressure is preferably reduced slowly so that the resin particles are inhibited from being foamed.

Further, the resin impregnated with carbon dioxide and/or nitrogen can be mixed with the non-impregnated resin in a suitable proportion to control an amount of carbon dioxide and/or nitrogen impregnated into the resin, whereby a resin particle raw material for injection molding can be prepared.

Next, the above resin particles are immediately supplied to an uppermost stream part of a cylinder in an injection molding machine and injection-molded on molding conditions according to the kind of the amorphous thermoplastic resin forming the above resin particles, whereby non-foamed molded bodies having various shapes can be prepared. The amorphous thermoplastic resin can be supplied to the injection molding machine by putting it into a usual raw material supplying port of the injection molding machine. In injection molding, a pressure and a temperature in a cylinder of the injection molding machine are set to not lower than a pressure and a temperature of carbon dioxide and/or nitrogen in a supercritical state, and therefore carbon dioxide and/or nitrogen are not released in the cylinder.

However, when the metal die is filled with the molten resin, 0.3 to 3.0% by mass of carbon dioxide impregnated and/or 0.05 to 1.0% by mass of nitrogen impregnated are released from a gas vent part on a joining surface between the metal dies, and carbon dioxide which is not dissolved in the amorphous thermoplastic resin is released by a back pressure when injected from the injection molding machine into the metal die and plasticized in the injection molding machine. Further, it is released by controlling the molding conditions such as the injection pressure and pressure keeping, and therefore it does not remain in the molded body and is not foamed to allow foamed patterns to remain on the surface of the molded body.

According to the process of the present invention, a conventional injection molding machine can be used as it is, and usual molding conditions can be applied. Accordingly, the molding efficiency is not reduced. The non-foamed molded body obtained is not colored and has an excellent appearance. Further, the molded body which is excellent in a die transferability and has less orientational distortion can efficiently be produced.

The process of the present invention is particularly suited to production of thin-walled molded bodies such as substrates, sheets, films and the like each having a thickness of 2 mm or less, particularly 1 mm or less.

EXAMPLES

Next, the present invention shall be explained in further details with reference to examples, but the present invention shall by no means be restricted by them.

Example 1

Pellets of commercial polycarbonate (trade name: A2200, manufactured by Idemitsu Kosan Co., Ltd., Mw: 27,100, Tg=145° C.) were dried at 90° C. for 5 hours, and then 100 g of the above pellets (hereinafter referred to as the "PC pellet-1") was put in a stainless gauze-made cylindrical rod (45 mm$\phi$, length 135 mm). The rod was mounted in an autoclave (manufactured by Taiatsu Kogyo Co., Ltd.) having a volume of 300 mL, and then the pellets were subjected to treatment with carbon dioxide at room temperature and a steel cylinder pressure of 5.4 MPa for 5 hours. Then, a pressure of carbon dioxide in the autoclave was removed in 10 minutes. A carbon dioxide ($CO_2$) impregnation amount of the PC pellet-1 calculated from a mass method shown below was 7.41% by mass.

$CO_2$ dissolution amount(% by mass)={[mass(g)of the cylindrical rod after impregnated with $CO_2$+mass (g)of the pellets after impregnated with $CO_2$]−[mass(g)of the cylindrical rod before impregnated with $CO_2$+mass(g)of the pellets before impregnated with $CO_2$]}/(mass(g)of the pellets before impregnated)×100

A mixture 500 g of the resulting PC pellet-1 100 g impregnated with carbon dioxide and the PC pellet-1 400 g impregnated with no carbon dioxide was put directly into a raw material supplying port (an uppermost stream part of a cylinder) of an injection molding machine (trade name: J35ELIII-F, manufactured by The Japan Steel Work, Ltd.). The pellet mixture had a carbon dioxide impregnation amount of 1.48% by mass.

Bore of cylinder: 25 mm
Screw revolution: 50 rpm
Injection conditions: speed 30 mm/second, pressure 130 MPa, time 1.3 second, die clamping 20 ton
Pressure keeping conditions: pressure 25 MPa, time 1.5 second
Back pressure: 5 MPa
Molding temperature: raw material supplying port 280° C., nozzle 320° C.
Metal die temperature: 80° C.
A bar flow metal die (spiral flow metal die: width 5 mm, thickness: 1 mm) was used under the injection molding conditions described above to evaluate influence of a resin flow length in the metal die exerted by impregnation treatment with carbon dioxide. As result thereof, the resin flow length in the metal die was 57 mm; a mass of the molded body was 1.4540 g; and a stability of the resin in biting was improved as well.

A sprue runner part of the molded body thus obtained was heated and pressed at a temperature of 260° C. for 10 minutes by means of a desktop press molding machine (manufactured by Imoto Seisakusho Co., Ltd.) to prepare a sheet having a thickness of 500 μm and 2 cm square.

A transmission factor of the sheet prepared was measured by means of a UV visible light spectrophotometer (trade name: V-550, manufactured by JASCO Corporation) to result in finding that the transmission factor in a visible light region (400 nm) was 82.5% and that the transmission factor in a UV region (300 nm) was 31.2%.

Further, an image of the molded body was introduced into a computer and compared with a chromaticity diagram by means of a color luminance meter (2D LCD COLOR ANALYZER, CD-1500, manufactured by Konica Minolta Holdings, Incorporated) to evaluate the coloring degree, and it resulted in finding that chromaticity $\Delta x=0.377$ and chromaticity $\Delta y=0.398$ and that the molded body was not observed to be colored (discoloration to a yellow color).

Comparative Example 1

The PC pellet-1 used in Example 1 was injection-molded as it was on the same conditions as in Example 1. It resulted in finding that the resin flow length in the metal die was 46 mm and that a weight of the molded body was 1.4205 g.

Further, the transmission factor was measured in the same manner as in Example 1 to result in finding that the transmission factor in a visible light region (400 nm) was 81.1% and that the transmission factor in a UV region (300 nm) was 26.2%. A coloring degree of the molded body was evaluated to result in finding that chromaticity $\Delta x=0.399$ and chromaticity $\Delta y=0.417$ and that the molded body was colored to yellow.

Comparing Example 1 with Comparative Example 1, the resin flow length in the metal die was increased by 24% in Example 1 from 46 mm (Comparative Example 1) to 57 mm (Example 1), and the turning force (torque) was reduced from 100% to 70%. In the untreated PC pellet-1 used in Comparative Example 1, a low molecular component at an end of a hydroxyl group was considered to be structurally changed by heat to reduce the transmission factor particularly in a UV region, and this is reflected on a degree of a yellow change in the molded body.

Example 2

The same procedure as in Example 1 was carried out, except that carbon dioxide was set to a supercritical state (10 MPa, 40° C.) and held for 3 hours to impregnate the PC pellet-1 with carbon dioxide.

As a result thereof, the PC pellet-1 thus obtained had a carbon dioxide impregnation amount of 9.0% by mass.

A mixture 500 g of the above PC pellet-1 100 g impregnated with carbon dioxide and the PC pellet-1 400 g impregnated with no carbon dioxide was put directly into a raw material supplying port (an uppermost stream part of a cylinder) of the injection molding machine (trade name: J35ELIII-F, manufactured by The Japan Steel Work, Ltd.). The pellet mixture had a carbon dioxide impregnation amount of 1.8% by mass.

Hereinafter, the same operation as in Example 1 was carried out to result in finding that the resin flow length in the metal die was 60 mm and that a mass of the molded body was 1.4580 g.

Comparing Example 2 with Comparative Example 1, the resin flow length in the metal die was increased by 30% from 46 mm (Comparative Example 1) to 60 mm (Example 2), and the turning force (torque) was reduced from 100% to 70%. Further, a die stability of the resin in biting was improved as well. Also, the molded body was not observed to be colored (discoloration to a yellow color).

Example 3

Pellets of commercial polycarbonate (trade name: Iupilon HL-4000, manufactured by Mitsubishi Engineering-Plastics Corporation, Mw: 12,000, Tg=145° C.) were dried at 90° C. for 5 hours, and then 100 g of the above pellets (hereinafter referred to as the "PC pellet-2") was put in a stainless gauze-made cylindrical rod (45 mmϕ, length 135 mm). The rod was mounted in an autoclave (manufactured by Taiatsu Kogyo Co., Ltd.) having a volume of 300 mL, and then the pellets were subjected to treatment with carbon dioxide at room temperature and a steel cylinder pressure of 5.4 MPa for 4 hours. Then, a pressure of carbon dioxide in the autoclave was removed in 10 minutes.

A carbon dioxide impregnation amount of the PC pellet-2 was calculated in the same manner as in Example 1 to result in finding that it was 6.61% by mass.

A mixture 400 g of the resulting PC pellet-2 40 g impregnated with carbon dioxide and the PC pellet-2 360 g impregnated with no carbon dioxide was put directly into a raw material supplying port (an uppermost stream part of a cylinder) of the injection molding machine (trade name: J35ELIII-F, manufactured by The Japan Steel Work, Ltd.). The pellet mixture had a carbon dioxide impregnation amount of 0.66% by mass.

Bore of cylinder: 25 mm
Screw revolution: 50 rpm
Injection conditions: speed 20 mm/second, pressure 100 MPa, time 1.5 second, die clamping 20 ton
Pressure keeping conditions: pressure 25 MPa, time 1.5 second
Back pressure: 5 MPa
Molding temperature: raw material supplying port 250° C., nozzle 280° C.
Metal die temperature: 80° C.

A bar flow metal die (spiral flow metal die: width 5 mm, thickness: 1 mm) was used under the injection molding conditions described above to evaluate influence of a resin flow length in the metal die exerted by impregnation treatment with carbon dioxide. As result thereof, the resin flow length in the metal die was 42 mm; a mass of the molded body was 1.413 g; and a stability of the resin in biting was improved as well.

Comparative Example 2

The PC pellet-2 used in Example 3 was injection-molded as it was on the same conditions as in Example 3. It resulted in finding that the resin flow length in the metal die was 40 mm and tat a mass of the molded body was 1.408 g.

Comparing Example 3 with Comparative Example 2, the resin flow length in the metal die was increased by 5% from 40 mm (Comparative Example 2) to 42 mm (Example 3), and the turning force (torque) was reduced from 17% to 15%.

Example 4

Pellets of commercial polymethyl methacrylate (trade name: Sumipex LG, manufactured by Sumitomo Chemical Co., Ltd., Mw: 100,000, Tg=100° C.) were dried at 90° C. for 5 hours, and then 100 g of the above pellets (hereinafter referred to as the "PMMA pellet") was put in a stainless gauze-made cylindrical rod (45 mmϕ, length 135 mm). The rod was mounted in an autoclave (manufactured by Taiatsu Kogyo Co., Ltd.) having a volume of 300 mL, and then the pellets were subjected to treatment with carbon dioxide at room temperature and a steel cylinder pressure of 5.7 MPa for 20 minutes. Then, a pressure of carbon dioxide in the autoclave was removed in 10 minutes.

A carbon dioxide impregnation amount of the PMMA pellet was calculated in the same manner as in Example 1 to result in finding that it was 7.5% by mass.

A mixture 500 g of the resulting PMMA pellet 100 g impregnated with carbon dioxide and the PMMA pellet 400 g impregnated with no carbon dioxide was put directly into a raw material supplying port (an uppermost stream part of a cylinder) of the injection molding machine (trade name: J35ELIII-F, manufactured by The Japan Steel Work, Ltd.). The pellet mixture had a carbon dioxide impregnation amount of 1.5% by mass.

Bore of cylinder: 25 mm
Screw revolution: 50 rpm
Injection conditions: speed 20 mm/second, pressure 100 MPa, time 1.3 second, die clamping 20 ton
Pressure keeping conditions: pressure 25 MPa, time 1.5 second
Back pressure: 5 MPa
Molding temperature: raw material supplying port 200° C., nozzle 250° C.
Metal die temperature: 60° C.

A bar flow metal die (spiral flow metal die) was used under the injection molding conditions described above to evaluate (n=10) influence of a resin flow length in the metal die exerted by impregnation treatment with carbon dioxide. As result thereof, the resin flow length in the metal die was 106 mm; a mass of the molded body was 1.7912 g; and a stability of the resin in biting was improved as well. Further, the molded body was not observed to be colored (discoloration to a yellow color).

Comparative Example 3

The PMMA pellet used in Example 4 was injection-molded as it was on the same conditions as in Example 3. As result thereof, the resin flow length in the metal die was 89 mm; a mass of the molded body was 1.7218 g; and the molded body was colored to a yellow color.

Comparing Example 4 with Comparative Example 3, the resin flow length was increased by 19% from 89 mm (Comparative Example 3) to 106 mm (Example 4), and the turning force (torque) was reduced from 50% to 40%. In the untreated PMMA pellet used in Comparative Example 2, a low molecular component at an end of a hydroxyl group was considered to be structurally changed by heat to reduce the transmission factor particularly in a UV region, and this is reflected on a degree of a yellow change in the molded body.

Example 5

Pellets 100 g of commercial polystyrene (trade name: HH32, manufactured by Idemitsu Kosan Co., Ltd., Mw: 321,000, Mw/Mn=2.3, Tg=105° C.) (hereinafter referred to as "PS pellet") were put in a stainless gauze-made cylindrical rod (45 mmφ, length 135 mm). The rod was mounted in an autoclave (manufactured by Taiatsu Kogyo Co., Ltd.) having a volume of 300 mL, and then the pellets were subjected to treatment with carbon dioxide at room temperature and a steel cylinder pressure of 4.0 MPa for 24 hours. Then, a pressure of carbon dioxide in the autoclave was removed in 10 minutes.

A carbon dioxide impregnation amount of the PS pellet was calculated in the same manner as in Example 1 to result in finding that it was 6.8% by mass.

A mixture 500 g of the resulting PS pellet 100 g impregnated with carbon dioxide and the PS pellet 400 g impregnated with no carbon dioxide was put directly into a raw material supplying port (an uppermost stream part of a cylinder) of the injection molding machine (trade name: J35ELIII-F, manufactured by The Japan Steel Work, Ltd.). The pellet mixture had a carbon dioxide impregnation amount of 1.36% by mass.

Bore of cylinder: 25 mm
Screw revolution: 50 rpm
Injection conditions: speed 20 mm/second, pressure 100 MPa, time 1.5 second, die clamping 20 ton
Pressure keeping conditions: pressure 25 MPa, time 1.5 second
Back pressure: 5 MPa
Molding temperature: raw material supplying port 200° C., nozzle 250° C.
Metal die temperature: 60° C.

A bar flow metal die (spiral flow metal die) was used under the injection molding conditions described above to evaluate (n=10) influence of a resin flow length in the metal die exerted by impregnation treatment with carbon dioxide. As result thereof, the resin flow length in the metal die was 160 mm; a mass of the molded body was 1.730 g; and a stability of the resin in biting was improved as well. Further, the molded body was not observed to be colored (discoloration to yellow color).

Comparative Example 4

The PS pellet used in Example 5 was injection-molded as it was on the same conditions as in Example 5. As result thereof, the resin flow length in the metal die was 150 mm; a mass of the molded body was 1.700 g; and the molded body was slightly colored to a yellow color.

Comparing Example 5 with Comparative Example 4, the resin flow length in the metal die was increased by 7% from 150 mm (Comparative Example 4) to 160 mm (Example 5), and the turning force (torque) was reduced from 17% to 15%.

Example 6

Pellets of commercial polycarbonate (trade name: Iupilon HL-4000, manufactured by Mitsubishi Engineering-Plastics Corporation, Mw: 12,000, Tg=145° C.) were dried at 100° C. for 5 hours, and then 1000 g of the above pellets (hereinafter referred to as the "PC pellet-3") was put in a stainless gauze-made cylindrical rod (100 mmφ, length 200 mm). The rod was mounted in an autoclave (manufactured by Taiatsu Kogyo Co., Ltd.) having a volume of 2 L, and then the pellets were subjected to treatment with carbon dioxide at room temperature and a steel cylinder pressure of 5.6 MPa for 24 hours. Then, a pressure of carbon dioxide in the autoclave was removed in 7 minutes.

A carbon dioxide impregnation amount of the PC pellet-3 was calculated in the same manner as in Example 1 to result in finding that it was 9.6% by mass.

A mixture 600 g of the resulting PC pellet-3 60 g impregnated with carbon dioxide and the PC pellet-3 540 g impregnated with no carbon dioxide was put directly into a raw material supplying port (an uppermost stream part of a cylinder) of the injection molding machine (trade name: J35ELIII-F, manufactured by The Japan Steel Work, Ltd.). The pellet mixture had a carbon dioxide impregnation amount of 0.96% by mass.

Bore of cylinder: 25 mm
Screw revolution: 50 rpm
Injection conditions: speed 100 mm/second, pressure 150 MPa, time 1.3 second, die clamping 20 ton
Pressure keeping conditions: pressure 100 MPa, time 1.5 second
Back pressure: 5 MPa
Molding temperature: raw material supplying port 240° C., nozzle 295° C.
Metal die temperature: 100° C.

A metal die for evaluating a transferability (metal die dimension; length: 39 mm, width: 28 mm, thickness: 0.5 mm, surface pattern; prismatic form having an interval of heights in threads between pitches: 26 μm, pitch height: 5.2 μm and pitch width: 18 μm) was used under the injection molding conditions described above to evaluate a transferability of the metal die onto the resin and an orientational distortion thereof exerted by impregnation treatment with carbon dioxide.

In this regard, the transferability was evaluated by a metal die transferability calculated from the following equation:

$$\text{metal die transferability}(\%) = [\text{pitch height}(\mu m) \text{ of molded body}/\text{pitch height}(\mu m) \text{ of metal die}] \times 100$$

A pitch height (μm) of the molded body was measured by means of a ultradeep color 3D shape measuring microscope (trade name: VK-9500, manufactured by KEYENCE CORPORATION).

The orientational distortion was evaluated by first determining a flow pattern of the whole part of the molded body by means of a polarizing strain indicator and then measuring a retardation (Re) based on the flow pattern obtained above by means of a spectrophotometer and a polarizing microscope.

The pitch height and the orientational distortion were measured in a central part (part of a longitudinal direction from a gate part: 20 mm and a width direction: 14 mm) of the molded body obtained by injection molding. As a result thereof, a pitch height of the molded body was 4.79 μm; the metal die transferability was 92.1%; and Re was 469 nm.

Example 7

A mixture 600 g of the PC pellet-3 100 g obtained in Example 6 which was subjected to treatment with carbon dioxide and the PC pellet-3 500 g impregnated with no carbon dioxide was used to carry out the same operation as in Example 6. As a result thereof, the pellet mixture had a carbon dioxide impregnation amount of 1.59% by mass; a pitch height of the molded body was 4.85 μm; the metal die transferability was 93.3%; and Re was 650 nm.

Example 8

A mixture 660 g of the PC pellet-3 200 g obtained in Example 6 which was subjected to treatment with carbon dioxide and the PC pellet-3 460 g impregnated with no carbon dioxide was used to carry out the same operation as in Example 6. As a result thereof, the pellet mixture had a carbon dioxide impregnation amount of 2.91% by mass; a pitch height of the molded body was 5.03 μm; the metal die transferability was 96.7%; and Re was 473 nm.

Comparative Example 5

A mixture 600 g of the PC pellet-3 200 g obtained in Example 6 which was subjected to treatment with carbon dioxide and the PC pellet-3 400 g impregnated with no carbon dioxide was used to carry out the same operation as in Example 6. As a result thereof, the pellet mixture had a carbon dioxide impregnation amount of 3.19% by mass. Because of air bubbles produced in the molded body, a pitch height of the molded body could not be evaluated, and therefore the metal die transferability was not obtained. The orientational distortion was 387 nm.

In Comparative Example 5, a carbon dioxide impregnation amount of the pellet mixture was high, and foamed patterns remained on the surface of the molded body. On the other hand, in Example 6, Re was reduced by 44% from 837 nm (Comparative Example 5) to 469 nm (Example 6). Further, in Example 8, Re was reduced by 43.5% from 837 nm (Comparative Example 5) to 473 nm (Example 8).

Comparative Example 6

The PC pellet-3 used in Example 6 was injection-molded as it was on the same conditions as in Example 1. As result thereof, a pitch height of the molded body obtained was 4.65 μm; a metal die transferability was 89.4%; and Re was 846 nm.

Comparing Example 6 with Comparative Example 6, the metal die transferability was raised from 89.4% (Comparative Example 6) to 92.1% (Example 6), and Re was reduced by 45% from 846 nm (Comparative Example 5) to 469 nm (Example 6). Further, comparing Example 7 with Comparative Example 6, the metal die transferability was raised from 89.4% (Comparative Example 6) to 93.3% (Example 7), and Re was reduced by 23% from 846 nm (Comparative Example 6) to 650 nm (Example 7). Also, comparing Example 8 with Comparative Example 6, the metal die transferability was raised from 89.4% (Comparative Example 6) to 96.7% (Example 8), and Re was reduced by 44% from 846 nm (Comparative Example 6) to 473 nm (Example 8).

It can be found from the above results that impregnation of 0.3 to 3.0% by mass of carbon dioxide elevates the fluidity, enhances the metal die transferability and reduces the orientational distortion.

Example 9

Pellets of commercial polycarbonate (trade name: Iupilon HL-4000, manufactured by Mitsubishi Engineering-Plastics Corporation, Mw: 12,000, Tg=145° C.) were dried at 100° C. for 5 hours, and 1000 g of the above pellets (hereinafter referred to as the "PC pellet") was put in a stainless gauze-made cylindrical rod (100 mmφ, length 200 mm). The rod was mounted in an autoclave (manufactured by Taiatsu Kogyo Co., Ltd.) having a volume of 2 L, and then the pellets were subjected to treatment with nitrogen at room temperature (22° C.) and a steel cylinder pressure of 10 MPa for 24 hours. Then, a pressure of nitrogen in the autoclave was removed in 7 minutes. A nitrogen ($N_2$) impregnation amount of the PC pellet calculated from a mass method shown below was 0.8% by mass.

$N_2$ dissolution amount(% by mass)={[mass(g)of the cylindrical rod after impregnated with $N_2$+mass (g)of the pellets after impregnated with $N_2$]−[mass(g)of the cylindrical rod before impregnated with $N_2$+mass(g)of the pellets before impregnated with $N_2$]}/(mass(g)of the pellets before impregnated)×100

A mixture 600 g of the resulting PC pellet 300 g impregnated with nitrogen and the PC pellet 300 g impregnated with no nitrogen was put directly into a raw material supplying port (an uppermost stream part of a cylinder) of the injection molding machine (trade name: J35ELIII-F, manufactured by The Japan Steel Work, Ltd.). The pellet mixture had a nitrogen impregnation amount of 0.4% by mass.

Bore of cylinder: 25 mm
Screw revolution: 50 rpm
Injection conditions: speed 125 mm/second, pressure 170 MPa, time 1.3 second, die clamping 20 ton
Pressure keeping conditions: pressure 140 MPa, time 1.5 second,
Back pressure: 10 MPa
Molding temperature: raw material supplying port 240° C., inside of the injection molding machine 300° C., nozzle 300° C.
Metal die temperature: 100° C.

A metal die for evaluating a transferability (metal die dimension; length: 39 mm, width: 28 mm, thickness: 0.5 mm, surface pattern; prismatic form having an interval of heights in threads between pitches: 26 μm, pitch height: 5.2 μm and pitch width 18 μm) was used under the injection molding conditions described above to evaluate a transferability of the metal die onto the resin and an orientational distortion thereof exerted by impregnation treatment of nitrogen.

In this regard, the transferability was evaluated by a metal die transferability calculated from the following equation:

metal die transferability(%)=[pitch height(μm)of molded body/pitch height(μm)of metal die]×100

A pitch height (μm) of the molded body was measured by means of the ultradeep color 3D shape measuring microscope (trade name: VK-9500, manufactured by KEYENCE CORPORATION).

The orientational distortion was evaluated by first determining a flow pattern of the whole part of the molded body by means of a polarizing strain indicator and then measuring a retardation (Re) based on the flow pattern obtained above by means of a spectrophotometer and a polarizing microscope.

The pitch height and the orientational distortion were measured in a central part (part of a longitudinal direction from a gate part: 20 mm and a width direction: 14 mm) of the molded body obtained by injection molding. As a result thereof, a pitch height of the molded body was 4.85 μm; the metal die transferability was 93.3%; and Re was 515 nm. Further, the molded body was not observed to be colored (discoloration to a yellow color).

Example 10

The PC pellet 600 g treated with nitrogen by the same method as in Example 9 was put directly into a raw material supplying port (an uppermost stream part of a cylinder) of the injection molding machine (trade name: J35ELIII-F, manufactured by The Japan Steel Work, Ltd.). The PC pellet had a nitrogen impregnation amount of 0.8% by mass.

Hereinafter, the same operation as in Example 9 was carried out, and as a result thereof, a pitch height of the molded body was 4.73 μm; the metal die transferability was 91.0%; and Re was 660 nm. Further, the molded body was not observed to be colored (discoloration to yellow color).

Comparative Example 7

The dried PC pellet used in Example 9 was injection-molded as it was on the same conditions as in Example 1. As result thereof, a pitch height of the molded body obtained was 4.65 μm; the metal die transferability was 89.4%; and Re was 846 nm.

Comparing Example 9 with Comparative Example 7, the metal die transferability was raised from 89.4% (Comparative Example 7) to 93.3% (Example 9), and Re was reduced by 39% from 846 nm (Comparative Example 7) to 515 nm (Example 9). Further, comparing Example 10 with Comparative Example 7, the metal die transferability was raised from 89.4% (Comparative Example 7) to 91.0% (Example 10), and Re was reduced by 22% from 846 nm (Comparative Example 7) to 660 nm (Example 10).

It can be found from the above results that impregnation of 0.05 to 1.0% by mass of nitrogen elevates the fluidity, enhances the metal die transferability and reduces the orientational distortion.

Example 11

Pellets of commercial cycloolefin (trade name: ZEONEX 480R, manufactured Zeon Corporation, Tg=140° C.) were dried at 100° C. for 5 hours, and 1000 g of the above pellets (hereinafter referred to as the "COP pellet") was put in a stainless gauze-made cylindrical rod (100 mm$\phi$, length 200 mm). The rod was mounted in an autoclave (manufactured by Taiatsu Kogyo Co., Ltd.) having a volume of 2 L, and then the pellets were subjected to treatment with nitrogen at room temperature (22° C.) and a steel cylinder pressure of 10 MPa for 24 hours. Then, a pressure of nitrogen in the autoclave was removed in 8 minutes.

A nitrogen ($N_2$) impregnation amount of the COP pellet was calculated in the same manner as in Example 9 to result in finding that it was 0.33% by mass.

The resulting COP pellet 600 g impregnated with nitrogen was put directly into a raw material supplying port (an uppermost stream part of a cylinder) of the injection molding machine (trade name: J35ELIII-F, manufactured by The Japan Steel Work, Ltd.).

Bore of cylinder: 25 mm
Screw revolution: 50 rpm
Injection conditions: speed 140 mm/second, pressure 175 MPa, time 1.3 second, die clamping 20 ton
Pressure keeping conditions: pressure 120 MPa, time 1.5 second,
Back pressure: 10 MPa
Molding temperature: raw material supplying port 220° C., inside of the injection molding machine 320° C., nozzle 315° C.
Metal die temperature: 100° C.

Hereinafter, the same operation as in Example 9 was carried out, and as a result thereof, a pitch height of the molded body was 4.80 µm; the metal die transferability was 92.3%; and Re was 323 nm. Further, the molded body was not observed to be colored (discoloration to yellow color).

Comparative Example 8

The dried COP pellet used in Example 11 was injection-molded as it was on the same conditions as in Example 3. As result thereof, a pitch height of the molded body obtained was 4.65 µm; the metal die transferability was 89.4%; and Re was 456 nm.

Comparing Example 11 with Comparative Example 8, the metal die transferability was raised from 89.4% (Comparative Example 8) to 92.3% (Example 11), and Re was reduced by 29% from 456 nm (Comparative Example 8) to 323 nm (Example 11).

INDUSTRIAL APPLICABILITY

According to the production process of the present invention, capable of being efficiently produced is a non-foamed molded body which is not colored and is excellent in an appearance as well as being improved in a fluidity of a resin and which is excellent in a transferability onto a metal die surface and has less orientational distortion and warpage of the molded body. Accordingly, the production process of the present invention can suitably be used in the micromolding processing field such as optical waveguides, diffraction gratings, micropatterns, microlenses and the like and the optical processing field such as lenses, prisms and the like.

Further the production process of the present invention is suited to injection molding of thermoplastic resins having too large molecular weights to injection mold, resins which are inferior in a thermal stability and which are liable to bring about heat decomposition, resins which have a high softening temperature and therefore have to be molded at high temperature (for example, engineering plastics) and resins blended with additives such as flame retardants which are liable to be thermally decomposed.

What is claimed is:

1. A process for the production of a non-foamed molded body, comprising:
    impregnating particles of an amorphous thermoplastic resin selected from the group consisting of polystyrene base resins, polycarbonate base resins, polymethacrylates resins, cycloolefin base resins, and mixtures thereof with 3 to 10% by mass of carbon dioxide and/or 0.05 to 1.0% by mass of nitrogen in a pressure vessel at a temperature of from 0 to 100° C. but not higher than the glass transition temperature of the amorphous thermoplastic resin to provide impregnated particles,
    mixing the impregnated particles with particles of the amorphous thermoplastic resin not impregnated with carbon dioxide or nitrogen to provide a mixture of particles having 0.3 to 3.0% by mass of carbon dioxide and/or 0.05 to 1.0% by mass of nitrogen, and
    supplying the mixture of particles to a raw material supplying port of an uppermost stream part of a cylinder in an injection molding machine and molding said mixture to provide a non-foamed molded body.

2. The process according to claim 1, wherein impregnation of carbon dioxide is carried out at a pressure of 1 to 40 MPa.

3. The process according to claim 1, wherein impregnation of nitrogen is carried out at a pressure of 1 to 30 MPa.

4. The process according to claim 1, wherein the amorphous thermoplastic resin is a polystyrene base resin.

5. The process according to claim 1, wherein the amorphous thermoplastic resin is a polycarbonate base resin.

6. The process according to claim 1, wherein the amorphous thermoplastic resin is a polymethacrylate base resin.

7. The process according to claim 1, wherein the amorphous thermoplastic resin is a cycloolefin base resin.

8. The process according to claim 1, comprising impregnating particles of the amorphous thermoplastic resin with 3 to 10% by mass of carbon dioxide and 0.05 to 1.0% by mass of nitrogen.

9. The process according to claim 1, comprising impregnating particles of the amorphous thermoplastic resin with 3 to 10% by mass of carbon dioxide and no nitrogen.

10. The process according to claim 1, comprising impregnating particles of the amorphous thermoplastic resin with 0.05 to 1.0% by mass of nitrogen and no carbon dioxide.

11. The process according to claim 1, comprising impregnating particles of the amorphous thermoplastic resin with 3 to 10% by mass of carbon dioxide.

12. The process according to claim 1, comprising impregnating particles of the amorphous thermoplastic resin with 0.05 to 1.0% by mass of nitrogen.

* * * * *